(12) United States Patent
Motoyama (10) Patent No.: US 8,929,648 B2
(45) Date of Patent: Jan. 6, 2015

(54) IMAGE PROCESSOR CAPABLE OF CLASSIFYING ORIGINAL AS COLOR ORIGINAL QUICKLY

(71) Applicant: Toshiki Motoyama, Kiyosu (JP)

(72) Inventor: Toshiki Motoyama, Kiyosu (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 130 days.

(21) Appl. No.: 13/780,468

(22) Filed: Feb. 28, 2013

(65) Prior Publication Data

US 2013/0223732 A1   Aug. 29, 2013

(30) Foreign Application Priority Data

Feb. 28, 2012   (JP) ................. 2012-041246

(51) Int. Cl.
*G06K 9/00*   (2006.01)
*G06K 9/62*   (2006.01)
*G06K 9/34*   (2006.01)

(52) U.S. Cl.
CPC ........ *G06K 9/00536* (2013.01); *G06K 9/00456* (2013.01)
USPC ........................................ 382/165; 382/224

(58) Field of Classification Search
CPC .. G06K 9/00536; G06K 9/00442; G06K 9/20
USPC ......... 382/162, 164, 165, 168, 172, 173, 199, 382/224, 225, 284; 358/1.15, 402, 462, 358/515, 518, 523, 530; 375/240.02
See application file for complete search history.

(56) References Cited

U.S. PATENT DOCUMENTS

| | | | | |
|---|---|---|---|---|
| 6,690,822 | B1 * | 2/2004 | Chen et al. | 382/162 |
| 7,333,965 | B2 * | 2/2008 | Tilford et al. | 706/20 |
| 7,567,707 | B2 * | 7/2009 | Willamowski et al. | 382/167 |
| 8,139,852 | B2 * | 3/2012 | Shinjo et al. | 382/165 |
| 8,175,379 | B2 * | 5/2012 | Wang et al. | 382/164 |
| 8,289,541 | B2 * | 10/2012 | Garg et al. | 358/1.15 |
| 8,358,691 | B1 * | 1/2013 | Wang et al. | 375/240.02 |
| 8,649,600 | B2 * | 2/2014 | Saund | 382/175 |
| 2011/0228361 | A1 | 9/2011 | Ohkawa | |
| 2013/0223732 | A1 * | 8/2013 | Motoyama | 382/165 |

FOREIGN PATENT DOCUMENTS

| | | |
|---|---|---|
| JP | 2003-116011 A | 4/2003 |
| JP | 2010-004383 A | 1/2010 |
| JP | 2011-193380 A | 9/2011 |

* cited by examiner

*Primary Examiner* — Amir Alavi
(74) *Attorney, Agent, or Firm* — Scully, Scott, Murphy & Presser, PC (57) ABSTRACT

An image processor reads an image from an original, divides the image into a plurality of blocks, and performs a determination process on each block. Through the determination process, a block is classified as a first color block or second color block. The image processor classifies the original as a color image when a number of first color blocks reach a prescribed number before the determination processes for all of the plurality of blocks have been completed. The image processor classifies the original as the color image when a number of first color blocks determined through the determination processes for all of the plurality of blocks is fewer than the prescribed number and a color ratio is greater than a prescribed ratio. The color ratio is the sum of the number of the first color blocks and the number of the second color blocks to the plurality of blocks.

8 Claims, 10 Drawing Sheets

IMAGE PROCESSOR CAPABLE OF CLASSIFYING ORIGINAL AS COLOR ORIGINAL QUICKLY

CROSS REFERENCE TO RELATED APPLICATION

This application claims priority from Japanese Patent Application No. 2012-041246 filed Feb. 28, 2012. The entire content of the priority application is incorporated herein by reference.

TECHNICAL FIELD

The present invention relates to an image processor.

BACKGROUND

Image processors commonly process scan data of an image formed on an original (original image) read by separate image-reading means configured of a compact image sensor (CIS) or the like. Some of these image processors classify the original image in one of various categories, such as a color original or a monochromatic original, based on the scan data.

SUMMARY

Of the original images that are classified as color originals, there are original images having strong color regions in which more than a prescribed number of color pixels are densely clustered together (hereinafter referred to as "strong color original images"), such as original images depicting graphics in solid chromatic colors; and color original images that do not have strong color regions (hereinafter referred to as "weak color original images"), such as original images depicting only lines in chromatic colors. The conventional image processor described above divides the scanned image into a plurality of blocks and classifies the original image as a color original when the ratio of color blocks to the total number of blocks is at least a prescribed value. In this way, the conventional image processor can classify both strong color original images and weak color original images as color originals.

Here, if the original image included in the scanned image is a strong color original image, it is possible to determine that the original image is a color original by detecting a strong color region, without having to perform block determination processes over the entire scanned image. However, since the conventional image processor never determines whether the original image should be classified as a color image until after completing the block determination process on all blocks in the scanned image, the sorting process for color originals is uniformly slow.

In view of the foregoing, it is an object of the present invention to provide an image processor capable of classifying both strong color original images and weak color original images as color originals and capable of classifying strong color original images as color originals without having to perform the block determination process on the entire scanned image.

In order to attain the above and other objects, the invention provides an image processor including an acquiring unit and a controller. The acquiring unit is configured to acquire image data indicative of a read image. The read image includes an original image. The original image is an image read from a sheet of original. The controller is configured to divide the read image into a plurality of blocks each having color information data. The controller is further configured to perform a block determination process on at least one of the plurality of blocks one by one. A block whose color information data satisfies a first color criterion is determined as a first color block through the block determination process. A block whose color information data fails to satisfy the first color criterion but satisfies a second color criterion lower than the first color criterion is determined as a second color block through the block determination process. The controller is further configured to execute one of a first classification and a second classification. The first classification is such that the original image is classified as a color image when a number of first color blocks determined through the block determination processes for the at least one of the plurality of blocks reaches a prescribed number before the block determination processes for all of the plurality of blocks have been completed. The second classification is such that the original image is classified as the color image when a number of first color blocks determined through the block determination processes for all of the plurality of blocks is fewer than the prescribed number and a color ratio is greater than a prescribed ratio. The color ratio is sum of the number of the first color blocks and the number of the second color blocks to the plurality of blocks.

According to another aspect, the present invention provides a non-transitory computer readable medium storing a set of program instructions installed on and executed by a computer. The program instructions includes: acquiring image data indicative of a read image, the read image including an original image, the original image being an image read from a sheet of original; dividing the read image into a plurality of blocks each having color information data; performing a block determination process on at least one of the plurality of blocks one by one, a block whose color information data satisfies a first color criterion being determined as a first color block through the block determination process, a block whose color information data fails to satisfy the first color criterion but satisfies a second color criterion lower than the first color criterion being determined as a second color block through the block determination process; and executing one of a first classification and a second classification, the first classification being such that the original image is classified as a color image when a number of first color blocks determined through the block determination processes for the at least one of the plurality of blocks reaches a prescribed number before the block determination processes for all of the plurality of blocks have been completed, the second classification being such that the original image is classified as the color image when a number of first color blocks determined through the block determination processes for all of the plurality of blocks is fewer than the prescribed number and a color ratio is greater than a prescribed ratio, the color ratio being sum of the number of the first color blocks and the number of the second color blocks to the plurality of blocks.

According to another aspect, the present invention provides an image processing method including: acquiring image data indicative of a read image, the read image including an original image, the original image being an image read from a sheet of original; dividing the read image into a plurality of blocks each having color information data; performing a block determination process on at least one of the plurality of blocks one by one, a block whose color information data satisfies a first color criterion being determined as a first color block through the block determination process, a block whose color information data fails to satisfy the first color criterion but satisfies a second color criterion lower than the first color criterion being determined as a second color block through the block determination process; and executing one of a first classification and a second classification, the first classification being such that the original image is classified as a color image when a number of first color blocks determined through the block determination processes for the at least one of the plurality of blocks reaches a prescribed number before the block determination processes for all of the plurality of blocks have been completed, the second classification being such that the original image is classified as the color image when a number of first color blocks determined through the block determination processes for all of the plurality of blocks is fewer than the prescribed number and a color ratio is greater than a prescribed ratio, the color ratio being sum of the number of the first color blocks and the number of the second color blocks to the plurality of blocks.

BRIEF DESCRIPTION OF THE DRAWINGS

The particular features and advantages of the invention as well as other objects will become apparent from the following description taken in connection with the accompanying drawings, in which.

DETAILED DESCRIPTION

Mechanical Structure of the Image Processor

Figure 1:
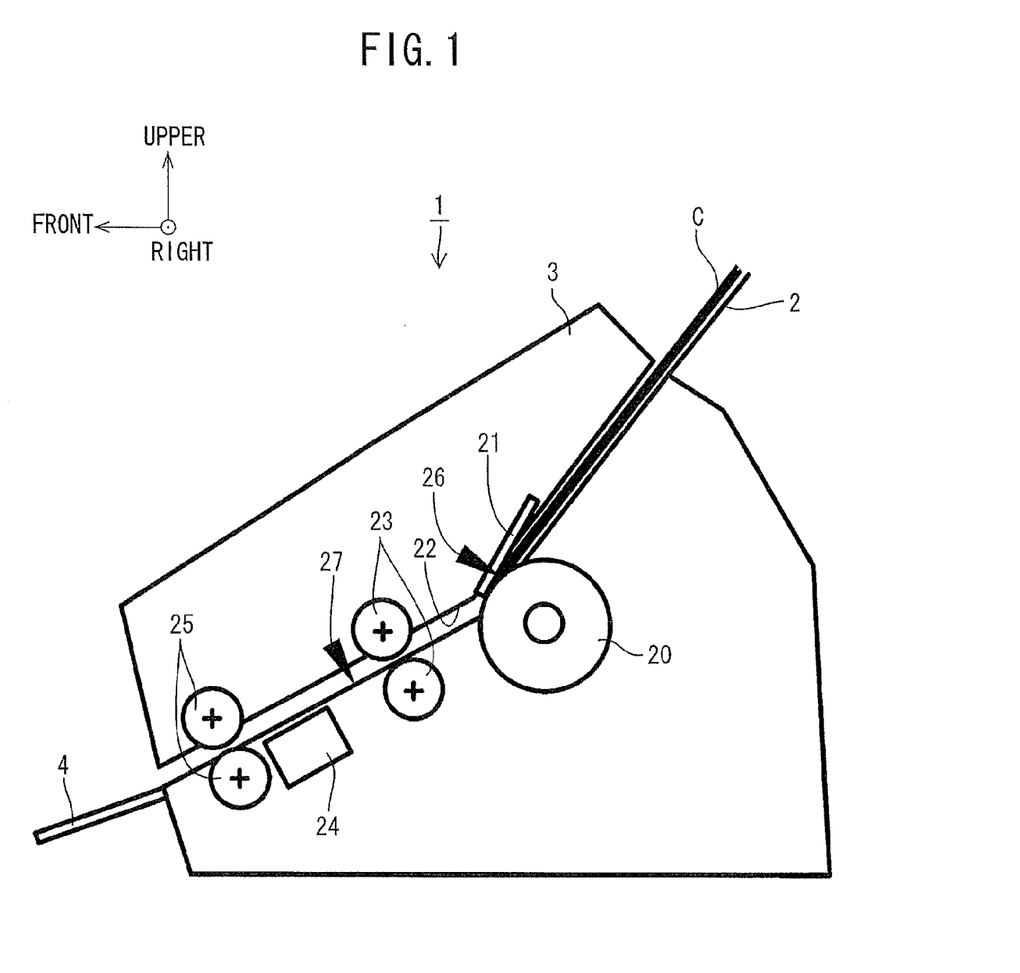
FIG. 1 is a cross-sectional diagram showing an image processor according to an embodiment of the present invention.

As shown in FIG. 1, an image processor 1 includes a sheet tray 2, a main body 3, and a tray 4. The image processor 1 is a sheetfed scanner that conveys sheets of an original C set in the sheet tray 2 through the main body 3 while a reading device 24 scans the sheet C to acquire a scanned image. Subsequently, the image processor 1 discharges the sheet C into the tray 4. Here, the sheets of the original C may be formed of paper, plastic, or another material.

The sheet tray 2 is disposed on the rear side of the main body 3 and slopes downward toward the front side. The sheet tray 2 is configured to accommodate one or a plurality of sheets of the original C. A conveying path 22 is formed inside the main body 3 and extends from the front edge of the sheet tray 2 to the rear edge of the tray 4. Disposed along the conveying path 22 in the main body 3 are a pickup roller 20, a separating pad 21, feeding rollers 23, the reading device 24, rollers 25 for discharging a sheet of the original C, a front sensor 26, and a rear sensor 27.

The pickup roller 20 is disposed on the front side of the sheet tray 2. When driven to rotate by a motor M (see FIG. 2), the pickup roller 20 draws one or a plurality of sheets of the original C set in the sheet tray 2 into the main body 3 through frictional force. The separating pad 21 is disposed in confrontation with the pickup roller 20 for separating sheets of original C drawn in by the pickup roller 20 through frictional force, so that the pickup roller 20 conveys only one sheet at a time into the main body 3.

The feeding rollers 23 are disposed on the conveying path 22 downstream of the pickup roller 20 and separating pad 21. When driven to rotate by the motor M, the feeding rollers 23 convey a sheet of the original C on the conveying path 22 forward.

The reading device 24 is disposed on the conveying path 22 downstream of the feeding rollers 23. The reading device 24 reads an image of each sheet of the original C conveyed by the feeding rollers 23.

The reading device 24 is disposed on the bottom side of the conveying path 22 and functions to read one surface (the bottom surface in FIG. 1) of each sheet. The reading device 24 has three light sources 31R, 31G, and 31B that emit the colors red (R), green (G), and blue (B), respectively, and an imaging unit with an array of light-receiving elements. For example, the reading device 24 may employ light-emitting diodes (LEDs) as the light sources and compact image sensors (CIS) or charge-coupled device (CCD) image sensors as the imaging unit. The reading device 24 can read images of the sheet C in a color format, as will be described later.

The rollers 25 are disposed along the conveying path 22 downstream of the reading device 24. The rollers 25 convey the sheets of the original C out of the main body 3 after the sheets have been scanned by the reading device 24. The discharge tray 4 is provided on the front side of the main body 3. Sheets of the original C discharged from the main body 3 are stacked on the discharge tray 4. The conveying path 22, pickup roller 20, feeding rollers 23, and rollers 25 constitute a conveying mechanism that is driven by the motor M.

The front sensor 26 is disposed on the front edge of the sheet tray 2. The front sensor 26 detects the presence of a sheet C in the sheet tray 2 and outputs the detection results. The rear sensor 27 is disposed on the conveying path 22 upstream of the reading device 24. The rear sensor 27 detects the presence of a sheet C being conveyed along the conveying path 22 and outputs the detection results.

Electrical Structure of the Image Processor

Figure 2:
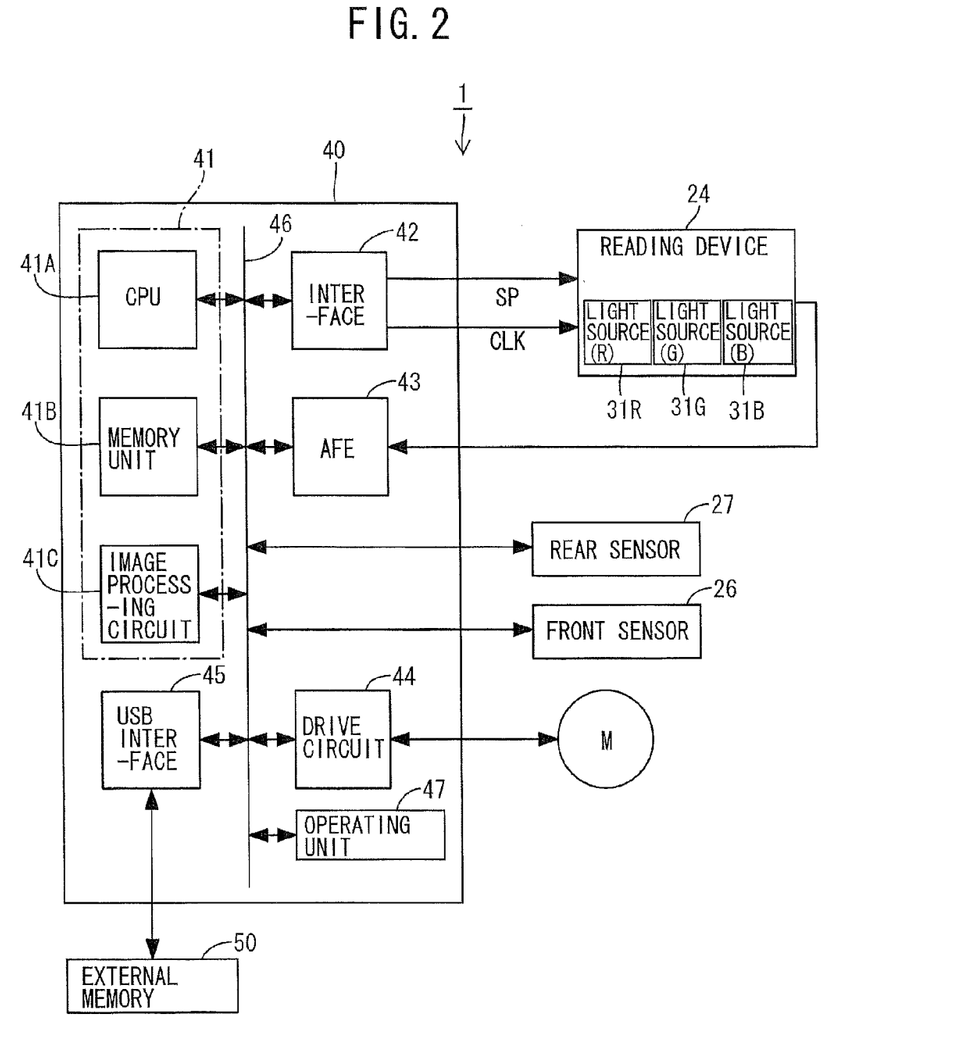
FIG. 2 is a block diagram showing an electrical structure of the image processor according to the embodiment.

As shown in FIG. 2, the image processor 1 is provided with a control circuit board 40. The control circuit board 40 is further provided with a control unit 41, an interface 42, an analog front-end (AFE) 43, a drive circuit 44, and a universal serial bus (USB) interface 45. These components are connected via a bus 46 to the front sensor 26, rear sensor 27, motor M, and an operating unit 47. The operating unit 47 includes a plurality of buttons that the user can operate to input various commands and settings.

The control unit 41 has a central processing unit (CPU) 41A, a memory unit 41B, and an image processing circuit 41C. The memory unit 41B stores various programs used for controlling operations of the image processor 1. The CPU 41A controls the components of the image processor 1 based on the programs read from the memory unit 41B. The memory unit 41B includes RAM, ROM, and the like. While RAM and ROM are used as media for storing the various programs in this embodiment, the programs may be stored on another type of nonvolatile memory, such as a CD-ROM, hard disk drive, or flash memory (registered trademark).

Figure 3:
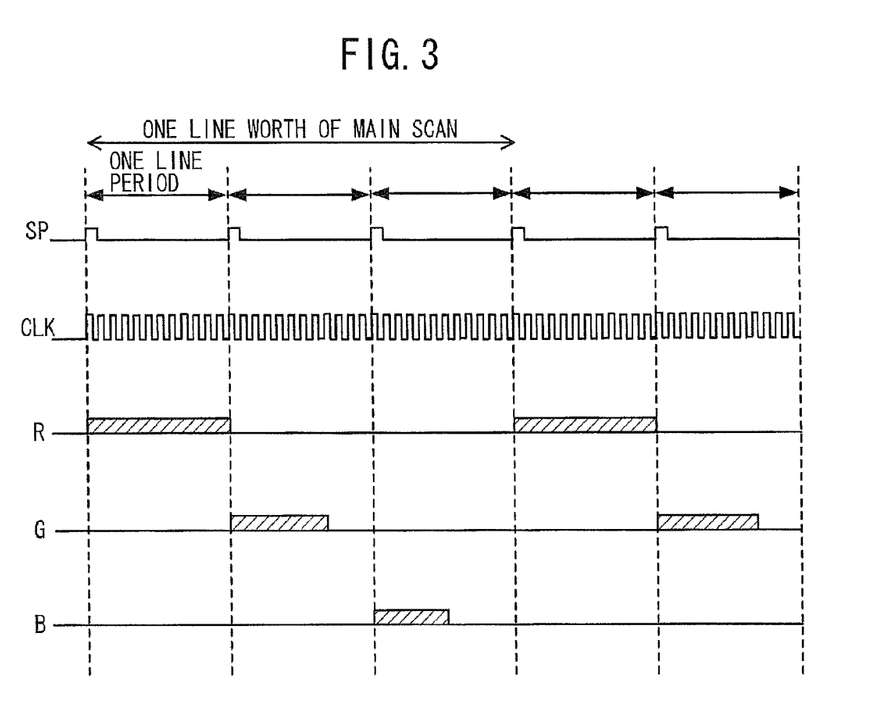
FIG. 3 is a timing chart illustrating light-emitting timings and signal reception timings.

The CPU 41A transmits control signals to the reading device 24 via the interface 42 for controlling the reading device 24. The control signals may include a synchronization signal SP and a clock signal CLK, for example. As shown in FIG. 3, the reading device 24 receives a synchronization signal SP every line period and controls the light sources 31R, 31G, and 31B through time-sharing (time-division) to sequentially emit light in synchronization with the synchronization signal SP reception timing. In synchronization with the timing at which each of the light sources 31R, 31G, and 31B emits light, the reading device 24 reads intensity values of light received by the light-receiving elements of the imaging unit based on the clock of the clock signal CLK and outputs an analog signal representing the read values (first scanned image data). Scan data for one line worth of a main scan is formed from the RGB analog signals read during the light-emitting periods of the light sources 31R, 31G, and 31B.

The AFE 43 converts the analog signal outputted by the reading device 24 as the first scanned image data to digital gradation data expressed in the RGB color space and stores this digital data in the memory unit 41B via the bus 46 as second scanned image data.

The image processing circuit 41C is a hardware circuit designed specifically for image processing. For example, the image processing circuit 41C may perform a process on the second scanned image data stored in the memory unit 41B for converting this data to the YCbCr color space described later and stores the resulting data in the memory unit 41B as third scanned image data. The drive circuit 44 controls the rotation of the motor M based on commands from the CPU 41A in order to convey sheets of the original C. An external memory 50, such as USB memory, may also be connected to the USB interface 45.

Categories of Original Images

By executing a reading process described later, the image processor 1 acquires reads an image from the sheet C of the original as an original image G and classifies the original image G in one of a plurality of original categories.

Figure 6:
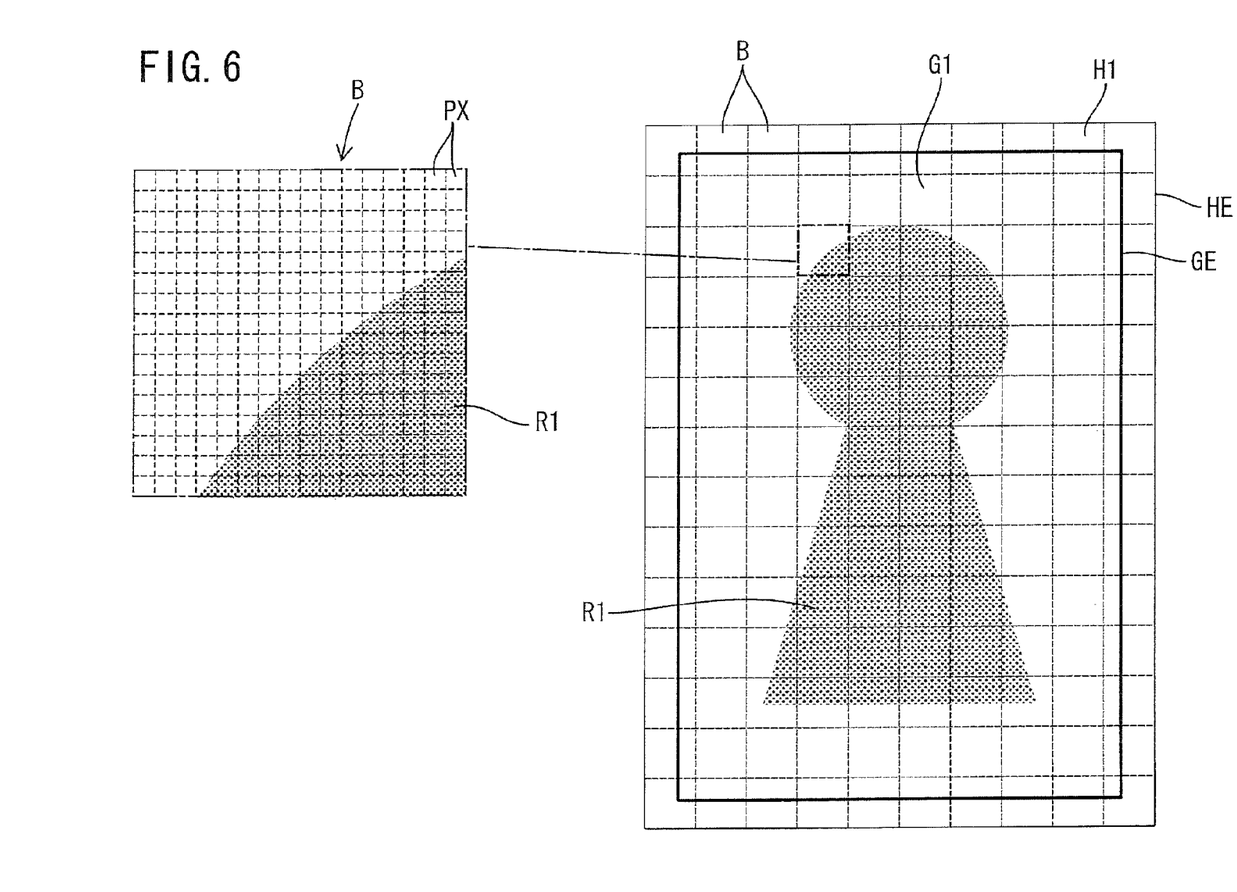
FIG. 6 is an explanatory diagram showing an example of strong color original.
Figure 7:
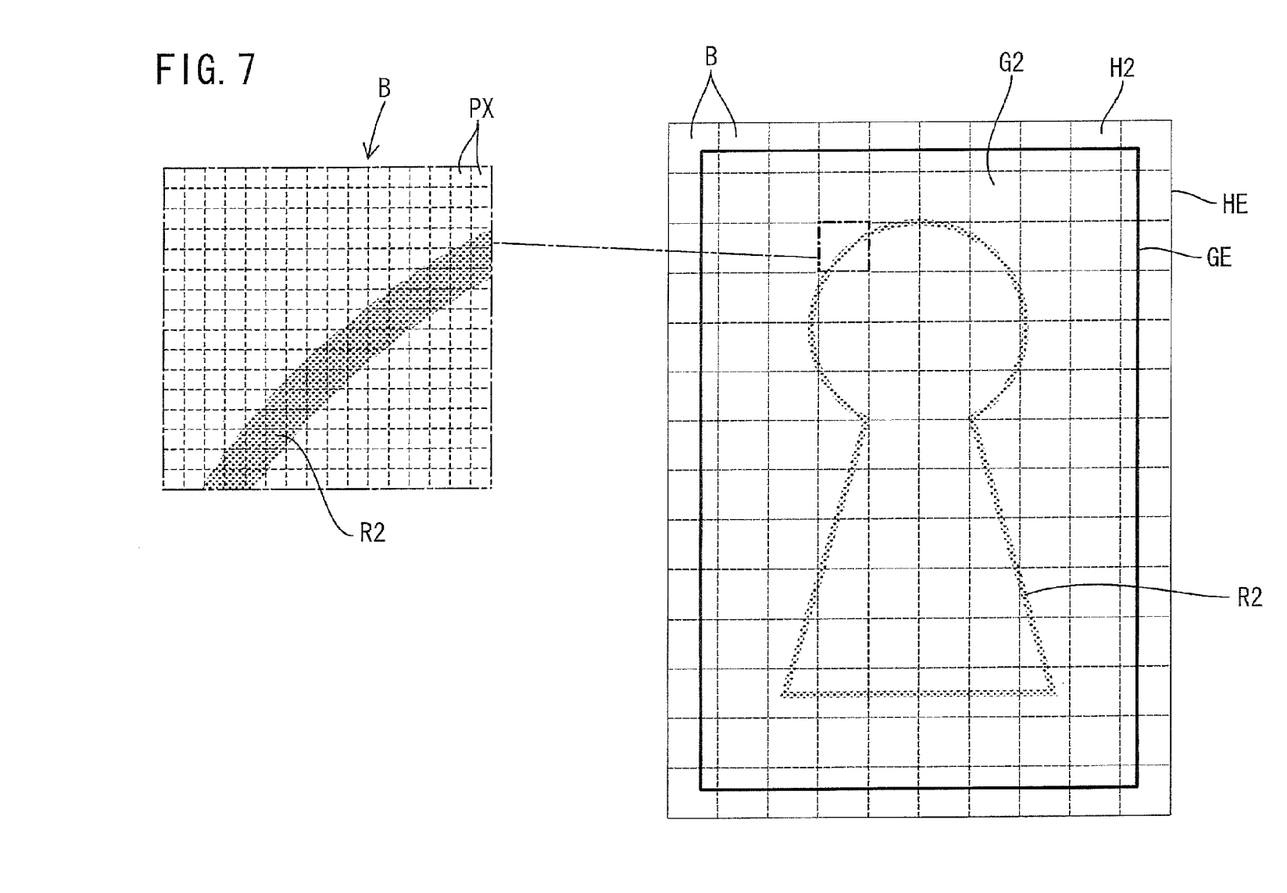
FIG. 7 is an explanatory diagram showing an example of weak color original.
Figure 8:
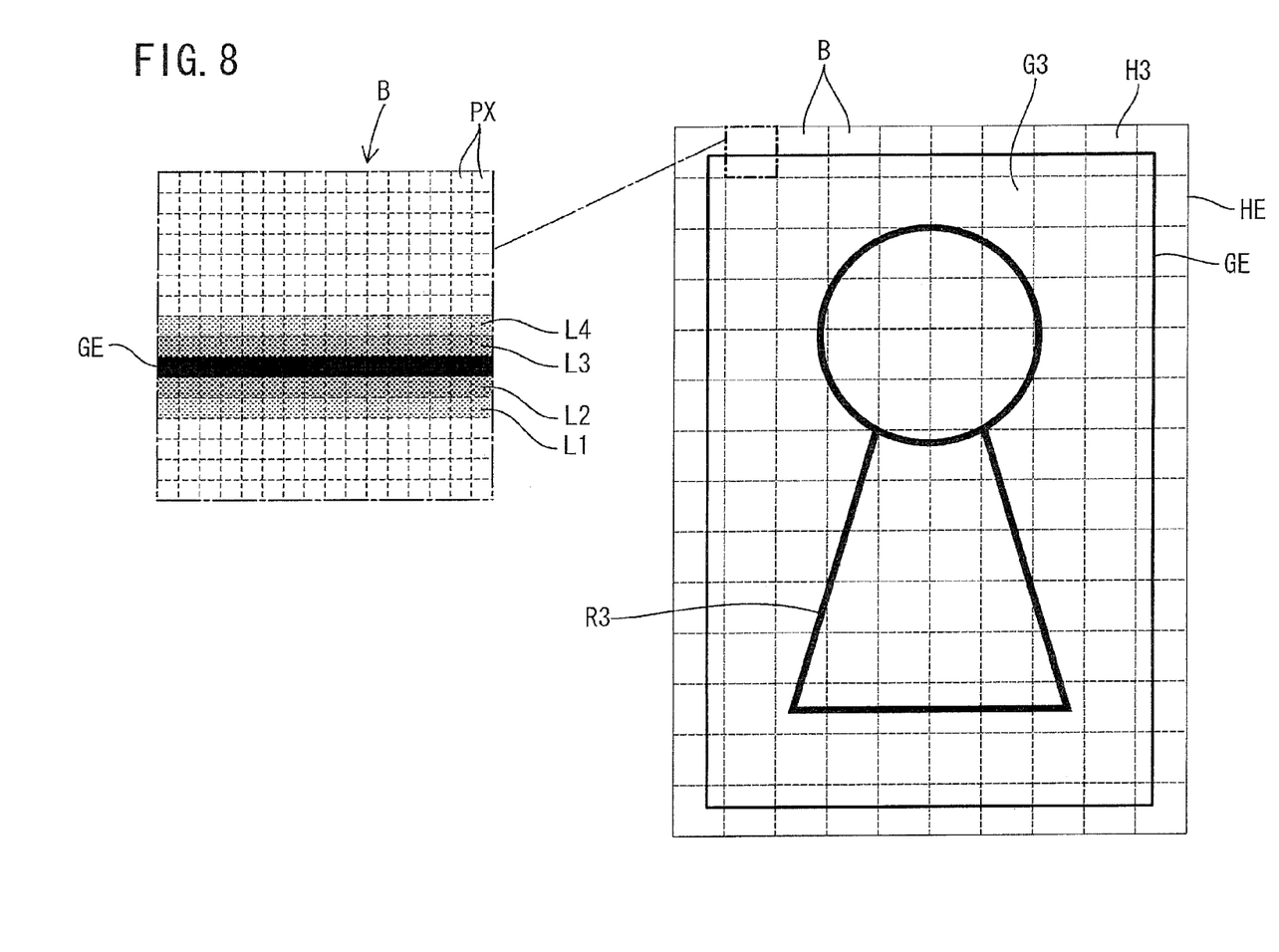
FIG. 8 is an explanatory diagram showing an example of achromatic original.

The original categories are determined based on colors represented in the original image G and include color originals, achromatic originals, and blank originals, for example. FIGS. 6 through 8 show scanning regions H (H1-H3), each of which includes one of the original images G (G1-G3). In the drawings, a solid line GE is an edge image of the original image G, and a solid line HE is an edge image of the scanning region H. Dashed lines in the scanning region H partition the scanning region H into blocks B produced in a block division process described later. The left side in each of FIGS. 6 through 8 is an enlarged view of a single block B. The dashed lines in the block B are partitioning lines for individual pixels PX.

A color original is an original image whose chromatic color regions occupy at least a prescribed surface area, i.e., whose total number of chromatic pixels is at least a prescribed number. Both strong color original images and weak color original images are classified as color originals. A strong color original image has a strong color region defined as a region having densely clustered chromatic pixels of at least a prescribed number. FIG. 6 shows an example of a strong color original image. In FIG. 6, an original image G1 depicts a graphic R1 that is filled with a solid chromatic color. A weak color original image does not have a strong color region, as in the example of FIG. 7. Here, an original image G2 depicts only a line R2 in a chromatic color.

An achromatic original is an original image whose chromatic color regions occupy less than the prescribed surface area, i.e., whose total number of chromatic pixels is fewer than the prescribed number; and whose achromatic color regions occupy at least a prescribed surface area, i.e., whose total number of achromatic pixels is at least a prescribed number. Examples of achromatic originals are black and white originals and grayscale originals.

The original image G3 in the scanning region H3 of the example in FIG. 8 is classified as an achromatic original because the original image G3 depicts only a graphic R3 configured of black lines. However, as illustrated in the enlarged block B on the left of FIG. 8, line images in chromatic colors may appear near the solid line GE of the original image G3. In the embodiment, the original image may be classified incorrectly as a color original if two line images in chromatic colors appear on both sides of the solid line GE, as in the line images L1-L4 in FIG. 8. The following factors may result in the appearance of these chromatic line images L1-L4.

As described above, the reading device 24 has the light sources 31R, 31G, and 31B, each of which emits a distinct color. The reading device 24 uses time-sharing for controlling the light sources 31R, 31G, and 31B to emit light at different timings and, in synchronization with the light-emission timings, generates an image by reading an area that includes the edges of the sheet C. Since the edges of the sheet C are normally much thinner than line images and the like depicted on the sheet C, in some cases not all of the light sources 31R, 31G, and 31B can emit light during the interval of an operation for reading the edges of the sheet C. As a result, the image near the edges of the sheet C may be formed based solely on analog signals obtained during light-emission timings for the light sources 31R and 31B, for example. This is likely the reason that chromatic line images appear near the solid line GE of the original image G3.

Reading Process

When the user places a sheet C on the sheet tray 2 and performs an operation on the operating unit 47 to input a scan command, the CPU 41A acquires detection results from the front sensor 26. If the CPU 41A determines that a sheet C is present on the sheet tray 2 based on the detection results, the CPU 41A reads a program for executing a reading process from the memory unit 41B and executes the reading process shown in FIGS. 4 and 5. The program for executing the reading process is an example of an image processing program.

Figure 4:
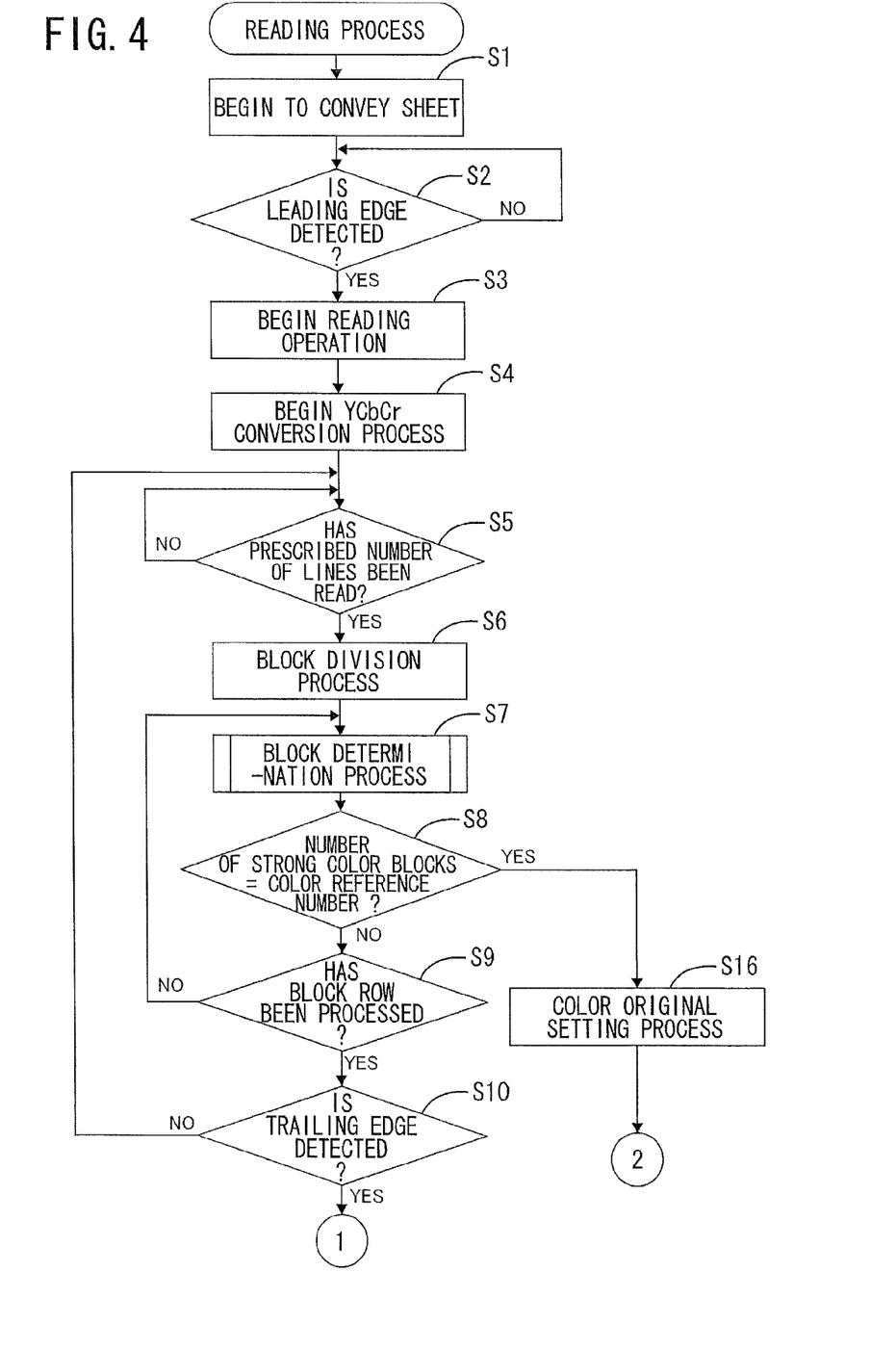
FIGS. 4 and 5 are flowcharts illustrating steps in a reading process executed by the image processor.

More specifically, in S1 of FIG. 4 the CPU 41A issues a command to the drive circuit 44 to begin driving the motor M to rotate in order to convey the sheet C from the sheet tray 2. In S2 the CPU 41A determines whether the leading edge of the sheet C was detected and repeatedly executes this process while the leading edge has not been detected (S2: NO). The CPU 41A detects the leading edge of the sheet C based on detection results from the rear sensor 27. When the CPU 41A detects the leading edge of the sheet C (S2: YES), in S3 the CPU 41A initiates a reading operation for controlling the reading device 24 to read the sheet C and to generate a scanned image. During the reading operation, the CPU 41A acquires and stores second scanned image data sequentially outputted from the AFE 43 in the memory unit 41B.

In S4 the CPU 41A continues executing the reading operation while instructing the image processing circuit 41C to begin a YCbCr conversion process. In the YCbCr conversion process, the image processing circuit 41C reads the second scanned image data from the memory unit 41B, converts this data from the RGB color space to data expressed in the YCbCr color space having a luminance component Y and two color difference components Cb and Cr and stores this data in the memory unit 41B as third scanned image data. In the embodiment, the luminance component Y has a possible range of 0-255, where a larger value indicates a greater luminance, while the color difference components Cb and Cr have a possible range of −128-+127, where a larger absolute value indicates a larger red or blue component.

(1) Block Division Process

After initiating the YCbCr conversion process, the CPU 41A begins a block division process in S6 each time a reading operation has been completed for a prescribed number of lines (S5: YES). The prescribed number of lines must be equivalent to at least the width of a single block B.

In the block division process, the CPU 41A divides the scanning region H into a plurality of blocks B based on the third scanned image data for the prescribed number of lines. The block division process forms a row of blocks in the scanning region H along the horizontal direction, as shown in FIGS. 6 through 8. The blocks B are square in shape and all of the same size. In S7 the CPU 41A executes a block determination process after initiating the block division process.

(2) Block Determination Process

The CPU 41A executes the processes in S7 and S8 on each block B in the row of blocks formed in the block division process by sequentially selecting each block B as the target block. The CPU 41A executes the block determination process shown in FIG. 9 on the target block. In S31 the CPU 41A first creates a histogram (frequency distribution graph) of color difference components Cb for all pixels included in the target block, identifies the Cb value specified by the most pixels as the most frequently occurring Cb value (Cb mode value), and sets the ratio of the number of pixels specifying the most frequently occurring Cb value to the total number of pixels in the target block as the occurrence ratio of the most frequently occurring Cb value. Similarly, in S31 the CPU 41A creates a histogram of color difference components Cr for all pixels included in the target block, identifies the Cr value specified by the most pixels as the most frequently occurring Cr value (Cr mode value), and determines the ratio of the number of pixels specifying the most frequently occurring Cr value to the total number of pixels in the target block as the occurrence ratio of the most frequently occurring Cr value.

Figure 9:
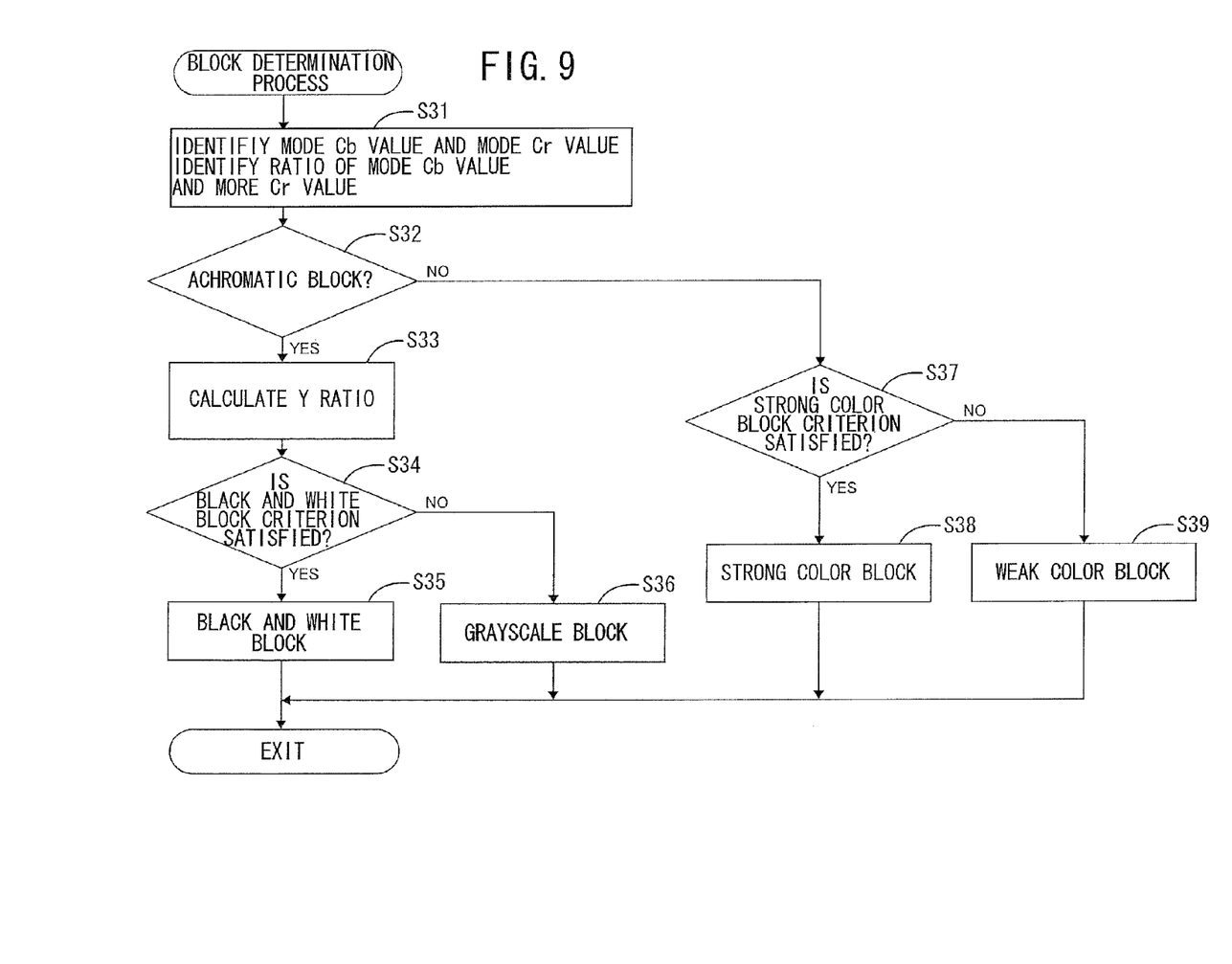
FIG. 9 is a flowchart illustrating steps in a block determination process in the reading process of FIG. 4.

In S32 the CPU 41A determines if the target block satisfies the criteria for an achromatic block. The following is an example of criteria for an achromatic block.

Occurrence ratio of the most frequently occurring Cb value=97% or greater, occurrence ratio of the most frequently occurring Cr value=97% or greater, most frequently occurring Cb value=112-143, and most frequently occurring Cr value=112-143

If the CPU 41A determines that the target block is an achromatic block, i.e., if the target block satisfies the achromatic block criteria (S32: YES), then in S33 the CPU 41A creates a histogram of Y values for all pixels in the target block, calculates the number of pixels whose Y value falls within a prescribed range (for example, less than or equal to 63 or greater than or equal to 224), and calculates the ratio of pixels in the prescribed range to the total number of pixels in the block B as the Y ratio. In S34 the CPU 41A determines whether the target block satisfies a criterion for a black and white block. The following is an example of a criterion for a black and white block.

Y ratio=40% or greater

If the CPU 41A determines that the target block satisfies the black and white block criterion (S34: YES), in S35 the CPU 41A determines that the target block is a black and white block. However, if the target block does not satisfy the black and white block criterion (S34: NO), then in S36 the CPU 41A determines that the target block is a grayscale block. Subsequently, the CPU 41A ends the current block division process and proceeds to S8 in FIG. 4.

On the other hand, if the CPU 41A determines that the target block does not satisfy the criteria for an achromatic block, i.e., that the target block is a chromatic block (S32: NO), then in S37 the CPU 41A determines whether the target block satisfies the criterion for a strong color block. The following is an example of a criterion for a strong color block.

The number of chromatic pixels (for example, pixels having Cb values outside the range −10−+10 or Cr values outside the range −10−+10) exceeds 32 (or the ratio of the number of chromatic pixels to the total number of pixels in the target block exceeds 12.5%).

If the target block satisfies the strong color block criterion (S37: YES), in S38 the CPU 41A determines that the target block is a strong color block. However, if the target block does not satisfy the strong color block criterion (S37: NO), then in S39 the CPU 41A determines that the target block is a weak color block. Subsequently, the CPU 41A ends the current block determination process and proceeds to S8 in FIG. 4. The 32 pixels defined in the criterion for a strong color block is the maximum number of pixels in chromatic line images L that can be included in a single block B, as shown in FIG. 8. Consequently, an achromatic block that includes chromatic line images L will not be determined to be a strong color block, but may be determined to be a weak color block.

In S8 of FIG. 4 the CPU 41A determines whether the total number of blocks found to be strong color blocks (hereinafter simply referred to as the "strong color block number") has reached a color reference number (12 in this example). If the strong color block number is less than the color reference number (S8: NO), in S9 the CPU 41A determines whether the process in S7 and S8 has been performed for all blocks B in the current block row. While the processes of S7 and S8 have not been performed on all blocks B in the current row (S9: NO), the CPU 41A returns to S7 and selects the next unprocessed block B as the target block. If the CPU 41A determines in S9 that the processes S7 and S8 have been completed for all blocks B in the current block row (S9: YES), then in S10 the CPU 41A determines whether the trailing edge of the sheet C was detected based on detection results from the rear sensor 27.

If the CPU 41A has not detected the trailing edge of the sheet C (S10: NO), indicating that the reading process has not been completed for the entire sheet C, the CPU 41A returns to S5 and repeats the process described above. However, when the CPU 41A detects the trailing edge of the sheet C (S10: YES), indicating that the entire sheet C has been read, in S11 of FIG. 5 the CPU 41A halts the reading operation. Since the strong color block number was less than the color reference number in this case, even though the block determination process of S7 was performed for all blocks B in the entire scanning region H obtained through the reading operations, in S12 the CPU 41A executes the original determination process shown in FIG. 10.

(3) Original Determination Process

Figure 10:
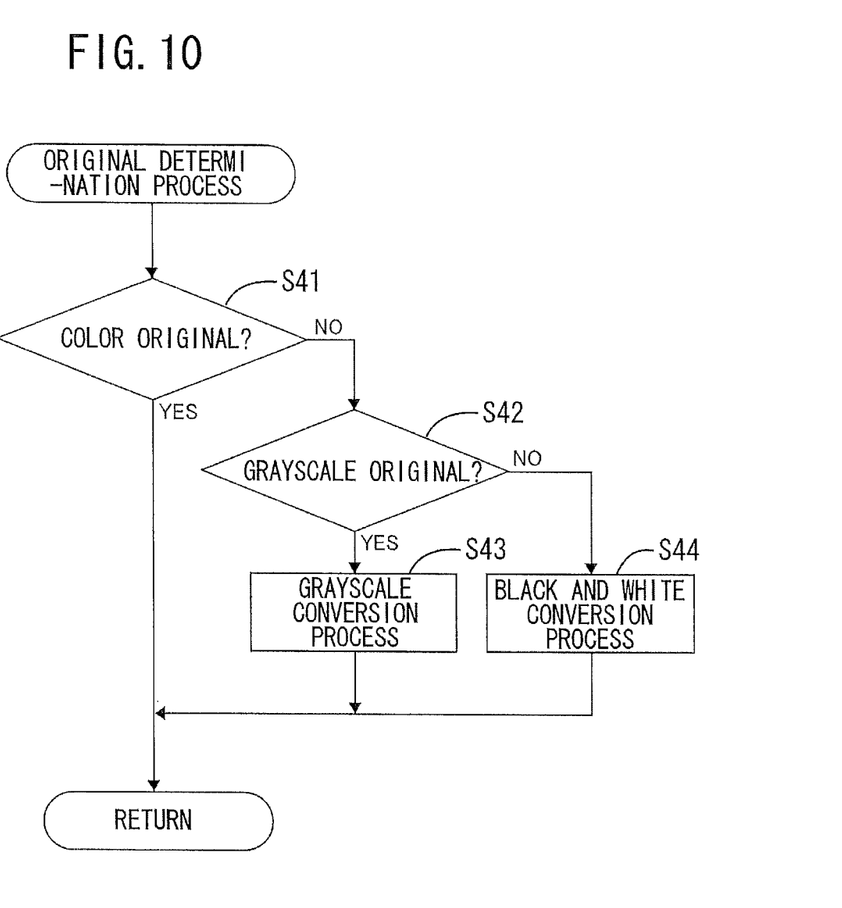
FIG. 10 is a flowchart illustrating steps in an original determination process in the reading process of FIG. 5.

In the original determination process, the CPU 41A uses the following determination criteria to sort original images G into one of the categories color original, grayscale original, and black and white original. The following are examples of the original determination criteria.

Color original criterion: the ratio of the sum of strong color blocks and weak color blocks to the total number of blocks in the scanning region H is at least 3%

Note that the percentage for the color original criterion is set higher than the ratio of the number of blocks described above in the case of the black and white original image G3 shown in FIG. 8 when chromatic line images L appear around the entire periphery of the original image G3. Consequently, the weak color original image G2 shown in FIG. 7 is classified as a color original that satisfies this color original criterion, while the black and white original image G3 in FIG. 8 is not classified as a color original as it does not satisfy the color original criterion.

Grayscale original criterion: an original image that does not satisfy the color original criterion and whose ratio of the number of grayscale blocks to the total number of blocks in the scanning region H is at least 3%

Black and white original criterion: an original image that does not satisfy the color original criterion or the grayscale original criterion Specifically, in S41 of FIG. 10, the CPU 41A determines whether the original image G is a color original. If the CPU 41A determines that the original image G is a color original (S41: YES), then the CPU 41A ends the current original determination process and advances to S13 of FIG. 5 without deleting any of the luminance component Y and color difference components Cb and Cr. However, if the CPU 41A determines that the original image G is not a color original (S41: NO), in S42 the CPU 41A determines whether the original image G is a grayscale original.

If the CPU 41A determines that the original image G is a grayscale original (S42: YES), then in S43 the CPU 41A executes a grayscale conversion process for deleting the color difference components Cb and Cr from the third scanned image data while leaving only the luminance component Y, and stores this luminance component Y in the external memory 50. Through this process, the CPU 41A can reduce the amount of third scanned image data stored in the external memory 50. Alternatively, the CPU 41A could be configured to convert the third scanned image data back to second scanned image data and to leave only one component from the RGB data.

However, if the CPU 41A determines that the original image G is not a grayscale original (S42: NO), indicating that the original image G is a black and white original, then in S44 the CPU 41A deletes the color difference components Cb and Cr from the third scanned image data leaving only the luminance component Y, executes a black and white conversion process for converting the color difference components Cb and Cr to binary (two-level) data, and stores this binary data and the luminance component Y in the external memory 50. Through this process, the CPU 41A can reduce the amount of third scanned image data stored in the external memory 50.

Figure 5:
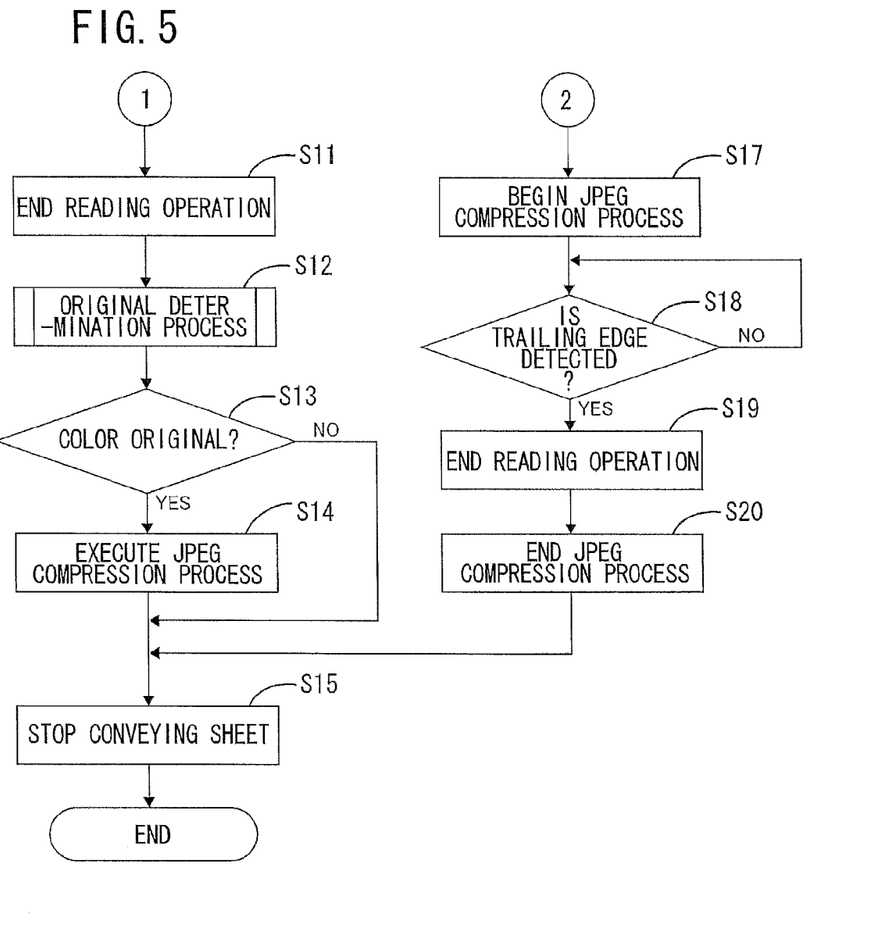

After completing the original determination process, in S13 of FIG. 5 the CPU 41A determines whether the original image G is a color original. If the original image G is a color original (S13: YES), in S14 the CPU 41A executes a JPEG (Joint Photographic Experts Group) compression process on the third scanned image data, in S15 halts the motor M to stop conveying the sheet C of original, and subsequently ends the current reading process.

(4) Color Original Determination Process

If the CPU 41A determines in S8 of FIG. 4 that the strong color block number has reached the color reference number (S8:YES), then the strong color block number has reached the color reference number before the block determination process of S7 has been completed for all blocks in the entire scanning region H. This indicates that a strong color region has been detected in the scanning region H. Hence in S16 the CPU 41A executes a color original setting process at this time to classify the original image G as a color original. In other words, when the block determination processes for the at least one of the plurality of blocks has been completed and the number of the strong color blocks reaches the prescribed number (S8:YES), the CPU 41A fails to perform the block determination processes on remaining blocks other than the at least one of the plurality of blocks that has been determined.

When the CPU 41A executes the color original setting process, the CPU 41A can discontinue the block division process and block determination process, thereby reducing the process load. In the case of the strong color original image G1 shown in FIG. 6, the CPU 41A can classify the original image G1 as a color original after performing the block determination process on the first five rows of blocks beginning from the top row because the number of strong color blocks have reached the color reference number (12 in the embodiment) at this point. Accordingly, the block division process and block determination process need not be executed on blocks in the sixth and subsequent rows. Subsequently, in S17 of FIG. 5 the CPU 41A can quickly initiate the JPEG compression process on the third scanned image data after executing the color original setting process.

After initiating the JPEG compression process, in S18 the CPU 41A attempts to detect the trailing edge of the sheet C. Upon detecting the trailing edge of the sheet C (S18: YES), indicating that the entire sheet C has been read, in S19 the CPU 41A ends the reading operation, in S20 ends the JPEG compression process, and subsequently advances to S15.

Effects of the Embodiment

The image processor 1 according to the embodiment begins a block determination process for each block B divided in the block division process, determines that the block B is a strong color block when color information data for pixels in the block B satisfies the first color reference (first criterion), and determines that the block B is a weak color block when the color information data does not satisfy the first color reference but satisfies a second color reference (second criterion) lower than the first color reference. If the number of blocks determined to be strong color blocks does not reach the color reference number after completing the block determination process for all blocks, then the image processor 1 determines that a strong color region was not detected and executes the original determination process for classifying the original image G as a color original on condition that the ratio of the sum of weak color blocks and strong color blocks to the total number of blocks is at least a color reference ratio. In this way, the image processor 1 can classify an original image G that is a weak color original as a color original.

On the other hand, if the number of blocks determined to be strong color blocks reaches the color reference number before the block determination process has been completed for all blocks, then the image processor 1 determines that a strong color region has been detected and executes the color original setting process for classifying the original image G as a color original. In this way, the image processor 1 can classify an original image G that is a strong color original as a color original before completing the block determination process.

With the color original setting process, the image processor 1 can suspend the block determination process when the number of blocks determined to be strong color blocks reaches the color reference number. Hence, after classifying the original image as a color original, the image processor 1 can essentially eliminate an unnecessary continuation of the block determination process.

It is preferable to initiate the process to compress scanned image data after classifying the original image G in the original category because processes performed prior to compression, such as converting scanned image data classified as a black and white original into single-color information data, may differ according to the original category. However, since the image processor 1 according to the embodiment can classify an original image as a color original when determining that the original image is color original based on the number of strong color blocks (a pre-determination-completion process), the image processor 1 can initiate the process to compress scanned image data before the block determination process has been performed on all blocks. Hence, the image processor 1 can initiate the compression process more quickly than when executing the block determination process for all blocks (a post-determination-completion process).

Further, the image processor 1 of the embodiment can reduce the likelihood of original images being incorrectly classified as color images when a black and white original image contains a very small number of chromatic pixels due to reading error and the like by the scanning device, for example, better than a configuration that uses pixel densities as the first color reference and second color reference. Moreover, the image processor 1 can classify an original image G as a color original while the reading device 24 is executing a reading operation on the sheet C when the original image G is a strong color original. Further, by determining that a block containing the chromatic line images L is not a strong color block, the image processor 1 can reduce the likelihood of an original image being incorrectly classified as a color original due to such line images L.

While the invention has been described in detail with reference to the embodiment thereof, it would be apparent to those skilled in the art that various changes and modifications may be made therein without departing from the spirit of the invention.

The example of the image processor in the above-described embodiment is a sheetfed scanner for moving sheets of the original C relative to a static reading device 24. However, the present invention may be applied to a flatbed-type image processor having a structure for moving the reading device relative to the sheet C that is stationary on a flatbed surface. In other words, the reading device may be configured to read the sheet C while moving at least one of the reading device and the sheet C relative to each other.

Further, the image processor of the present invention is not limited to a standalone scanner, but may be a printing device, copy machine, or multifunction peripheral having a copy function, facsimile function, and the like. Further, the present invention may be applied to an image processor, such as a personal computer, that is not provided with a reading device, but that acquires data for a scanned image from an external device, such as a scanner or external memory, via an interface.

While the image processor 1 according to the above-described embodiment acquires scanned image data through the AFE 43, the image data may be acquired via a connector, such as a USB interface, connected to and capable of communicating with an external storage device storing scanned image data or an external device that transmits scanned image data.

Alternatively, the reading process may be executed with only the CPU 41A and memory unit 41B, eliminating the image processing circuit 41C. Further, the control unit may be configured of a plurality of CPUs, a hardware circuit such as an application-specific integrated circuit (ASIC), or a structure including both a hardware circuit and CPUs. For example, at least two of the block division process, block determination process, pre-determination-completion process (S8), post-determination completion process (S12), JPEG compression process, YCbCr conversion process, and the like may be implemented separately by a CPU and hardware circuit. The order of these processes may also be adjusted as desired.

In the above-described embodiment, the control unit 41 sets the analysis scope of the block division process, block determination process, original determination process, and color original determination process to the entire scanning region H. However, the analysis scope of the block division process and other processes may be set to a portion of the scanning region H instead. Further, while the reading device 24 acquires a scanning region H including the solid line GE of the original image G, the reading device 24 may instead acquire a scanning region H that does not include the solid line GE of the original image G.

What is claimed is:

1. An image processor comprising:
    an acquiring unit configured to acquire image data indicative of a read image, the read image including an original image, the original image being an image read from a sheet of original;
    a controller configured to:
        divide the read image into a plurality of blocks each having color information data;
        perform a block determination process on at least one of the plurality of blocks one by one, a block whose color information data satisfies a first color criterion being determined as a first color block through the block determination process, a block whose color information data fails to satisfy the first color criterion but satisfies a second color criterion lower than the first color criterion being determined as a second color block through the block determination process; and
        execute one of a first classification and a second classification, the first classification being such that the original image is classified as a color image when a number of first color blocks determined through the block determination processes for the at least one of the plurality of blocks reaches a prescribed number before the block determination processes for all of the plurality of blocks have been completed, the second classification being such that the original image is classified as the color image when a number of first color blocks determined through the block determination processes for all of the plurality of blocks is fewer than the prescribed number and a color ratio is greater than a prescribed ratio, the color ratio being sum of the number of the first color blocks and the number of the second color blocks to the plurality of blocks.

2. The image processor according to claim 1, wherein when the block determination processes for the at least one of the plurality of blocks has been completed and the number of the first color blocks reaches the prescribed number, the controller fails to perform the block determination processes on remaining blocks other than the at least one of the plurality of blocks.

3. The image processor according to claim 1, wherein the controller is further configured to compress the image data, the controller starting to compress the image data after the block determination processes for all of the plurality of blocks have been completed when the number of first color blocks determined through the block determination processes for all of the plurality of blocks is fewer than the prescribed number and the color ratio is greater than a prescribed ratio, the controller starting to compress the image data before the block determination processes for all of the plurality of blocks have been completed when the block determination processes for the at least one of the plurality of blocks is completed and the number of the first color blocks reaches the prescribed number.

4. The image processor according to claim 1, wherein each of the plurality of blocks has a plurality of pixels;

wherein the first color criterion is defined by a color pixel ratio of a number of color pixels in one block to a total number of pixels in the one block being greater than or equal to a first reference value;

wherein the second color criterion is defined by the color pixel ratio being smaller than the first reference value and greater than or equal to a second reference value, the second reference value being smaller than the first reference value.

5. The image processor according to claim 1, further comprising a reading device configured to read the sheet while moving at least one of the reading device and the sheet relative to each other to generate the image data;

wherein the acquiring unit receives the image data from the reading device;

wherein, while the reading device reads the sheet, the controller has performed the block determination processes for the at least one of the plurality of blocks and classified the original image as the color image based on the at least one of the plurality of blocks determined through the block determination processes.

6. The image processor according to claim 5, wherein the reading device includes a plurality of light sources configured to emit a plurality of color light beams, respectively;

wherein the controller controls the plurality of light sources to emit respective color light beams at respective light-emission timings through time-sharing and controls the reading device to read an area including edges of the sheet in synchronization with the respective light-emission timings to generate the image data.

7. A non-transitory computer readable medium storing a set of program instructions installed on and executed by a computer, the program instructions comprising:

acquiring image data indicative of a read image, the read image including an original image, the original image being an image read from a sheet of original;

dividing the read image into a plurality of blocks each having color information data;

performing a block determination process on at least one of the plurality of blocks one by one, a block whose color information data satisfies a first color criterion being determined as a first color block through the block determination process, a block whose color information data fails to satisfy the first color criterion but satisfies a second color criterion lower than the first color criterion being determined as a second color block through the block determination process; and executing one of a first classification and a second classification, the first classification being such that the original image is classified as a color image when a number of first color blocks determined through the block determination processes for the at least one of the plurality of blocks reaches a prescribed number before the block determination processes for all of the plurality of blocks have been completed, the second classification being such that the original image is classified as the color image when a number of first color blocks determined through the block determination processes for all of the plurality of blocks is fewer than the prescribed number and a color ratio is greater than a prescribed ratio, the color ratio being sum of the number of the first color blocks and the number of the second color blocks to the plurality of blocks.

8. An image processing method comprising:

acquiring image data indicative of a read image, the read image including an original image, the original image being an image read from a sheet of original;

dividing the read image into a plurality of blocks each having color information data;

performing a block determination process on at least one of the plurality of blocks one by one, a block whose color information data satisfies a first color criterion being determined as a first color block through the block determination process, a block whose color information data fails to satisfy the first color criterion but satisfies a second color criterion lower than the first color criterion being determined as a second color block through the block determination process; and executing one of a first classification and a second classification, the first classification being such that the original image is classified as a color image when a number of first color blocks determined through the block determination processes for the at least one of the plurality of blocks reaches a prescribed number before the block determination processes for all of the plurality of blocks have been completed, the second classification being such that the original image is classified as the color image when a number of first color blocks determined through the block determination processes for all of the plurality of blocks is fewer than the prescribed number and a color ratio is greater than a prescribed ratio, the color ratio being sum of the number of the first color blocks and the number of the second color blocks to the plurality of blocks.

* * * * *